(12) United States Patent
Billman et al.

(10) Patent No.: US 8,635,779 B2
(45) Date of Patent: Jan. 28, 2014

(54) METHOD OF SERVICING A COUPLING CONNECTING TWO NON-COLLINEAR SHAFTS

(71) Applicant: Omar Associates, LLC, Omar, OH (US)

(72) Inventors: Chad W. Billman, Sandusky, OH (US); Elaine A. Chappell, Norwalk, OH (US); Eric J. Wise, Avon, OH (US)

(73) Assignee: Omar Associates, LLC, Omar, OH (US)

( * ) Notice: Subject to any disclaimer, the term of this patent is extended or adjusted under 35 U.S.C. 154(b) by 0 days.

(21) Appl. No.: 13/937,971

(22) Filed: Jul. 9, 2013

(65) Prior Publication Data

US 2013/0291357 A1 Nov. 7, 2013

Related U.S. Application Data

(62) Division of application No. 13/349,240, filed on Jan. 12, 2012, now Pat. No. 8,500,565.

(60) Provisional application No. 61/452,530, filed on Mar. 14, 2011.

(51) Int. Cl.
  *B23P 6/00* (2006.01)
  *B21D 53/10* (2006.01)
  *F16D 3/40* (2006.01)

(52) U.S. Cl.
  USPC .................. 29/898.01; 29/402.03; 29/402.08

(58) Field of Classification Search
  USPC ......... 464/125, 126, 127, 132, 134, 135, 136; 29/402.02, 402.03, 402.08, 898.01
  See application file for complete search history.

(56) References Cited

U.S. PATENT DOCUMENTS

| | | | |
|---|---|---|---|
| 714,327 | A | 11/1902 | Pittman |
| 779,903 | A | 1/1905 | Bocorselski |
| 1,153,789 | A | 9/1915 | Hopkins |
| 1,232,540 | A | 7/1917 | Hartmann |
| 1,247,290 | A | 11/1917 | Lehman |
| 1,918,613 | A | 7/1933 | Peters |
| 3,213,644 | A | 10/1965 | Murphy |
| 3,326,016 | A | 6/1967 | Purcell |
| 2008/0200264 | A1 | 8/2008 | Falk |
| 2008/0234056 | A1 | 9/2008 | Grawenhof |

FOREIGN PATENT DOCUMENTS

EP 0160319 A2 11/1985

*Primary Examiner* — Gregory Binda
*Assistant Examiner* — Matthieu Setliff
(74) *Attorney, Agent, or Firm* — Rankin, Hill & Clark LLP

(57) ABSTRACT

A method for servicing a coupling connecting two non-collinear shafts, which coupling includes a pair of sleeves each having a yoke provided at an end portion thereof, a knuckle provided between each yoke that includes a body having a plurality of openings, a plurality of bushings each positioned in one of the openings, and a plurality of separate pins threadingly engaged to the yokes for releasably connecting the yokes to the knuckle. The method includes loosening a pair of opposed pins on one of the yokes such that an end portion of each pin is spaced from the corresponding bushing, which disengages that yoke from the knuckle, separating the disengaged yoke from the coupling, removing a worn bushing, inserting a different bushing in the opening, positioning the yoke to reengage the knuckle and tightening the pins on the yoke until the end portion of each pin engages the corresponding bushing.

16 Claims, 6 Drawing Sheets

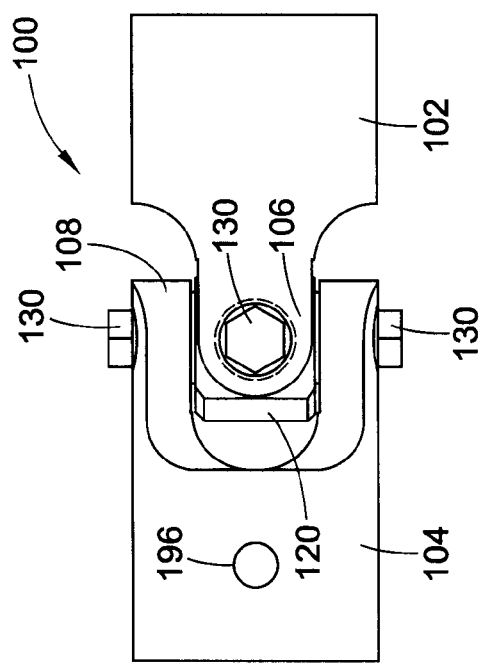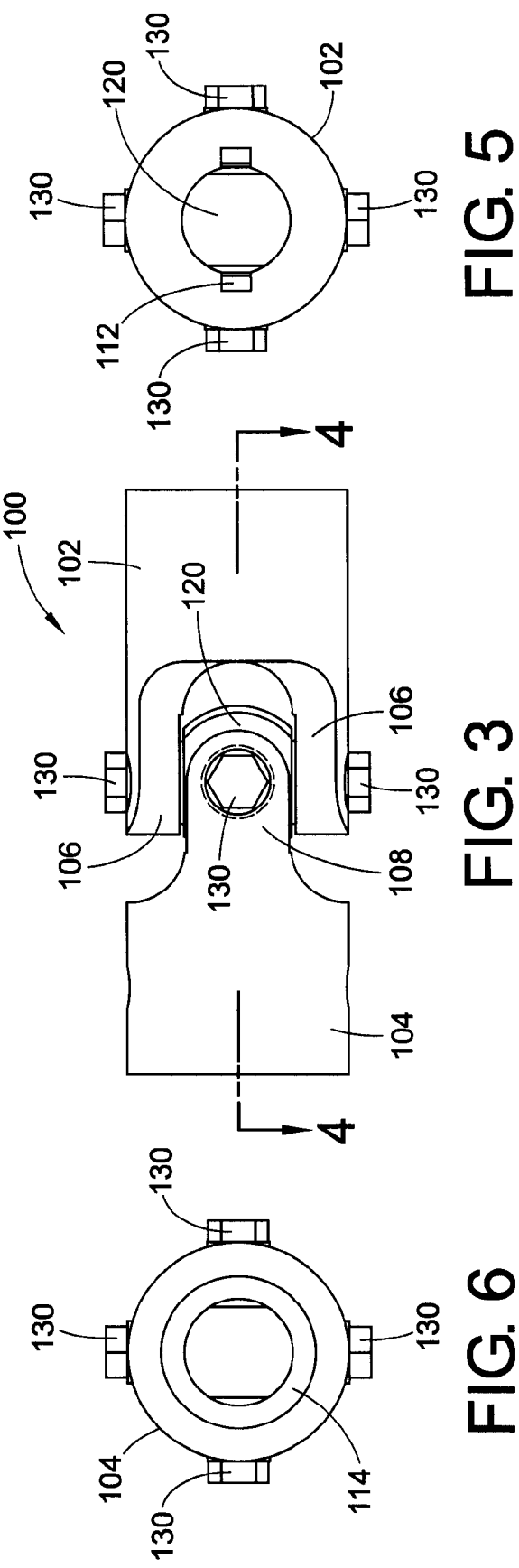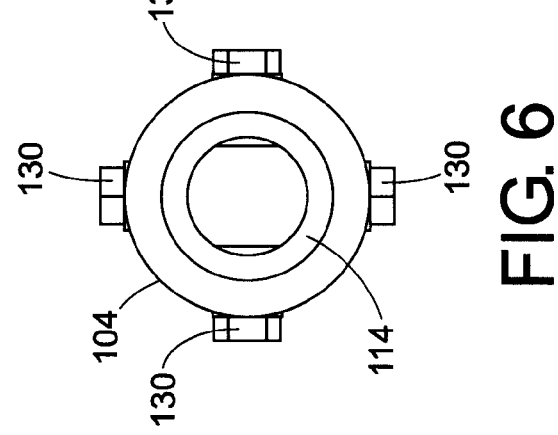

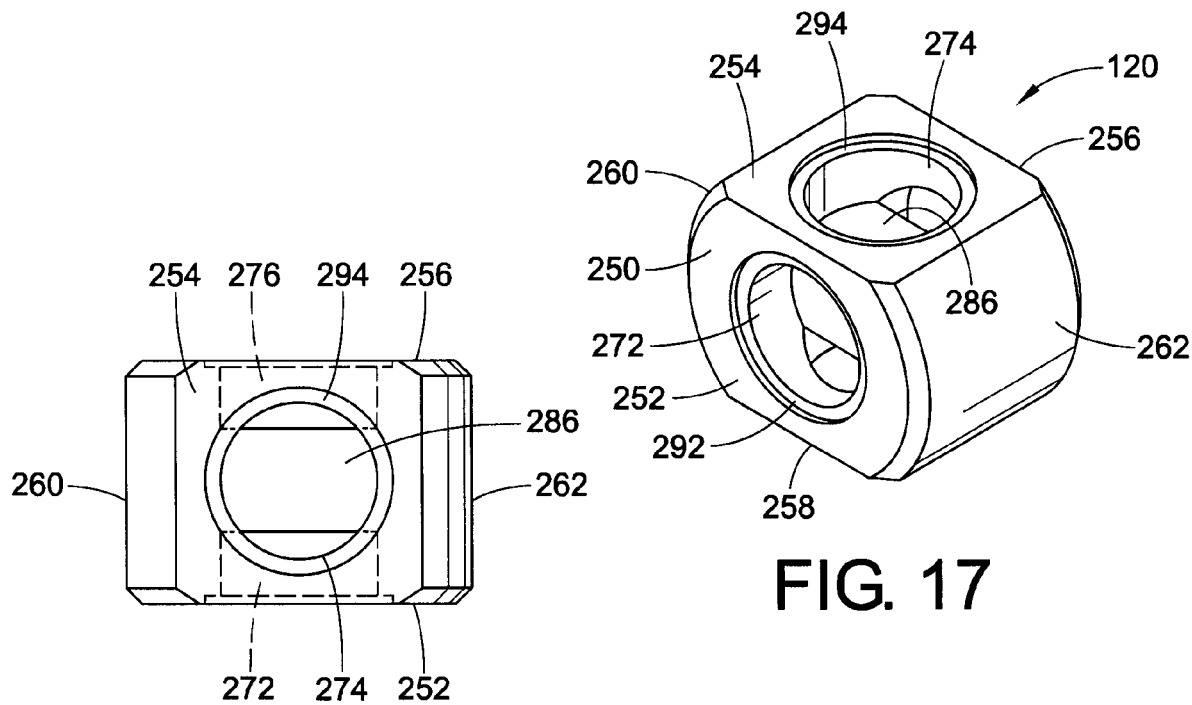
FIG. 17
FIG. 20
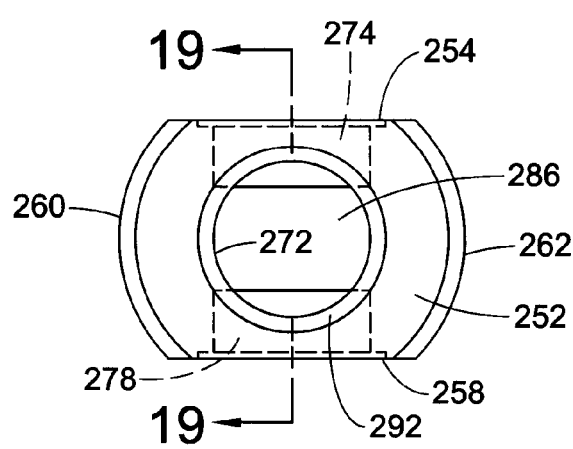
FIG. 18
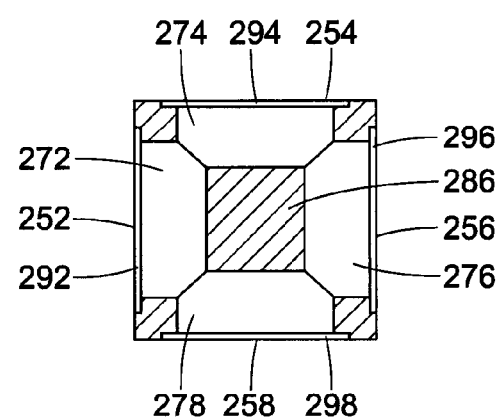
FIG. 19

METHOD OF SERVICING A COUPLING CONNECTING TWO NON-COLLINEAR SHAFTS

CROSS-REFERENCE TO RELATED APPLICATIONS

This application is a division of application Ser. No. 13/349,240, filed Jan. 12, 2012, now U.S. Pat. No. 8,500,565, and claims priority to U.S. Provisional App. Ser. No. 61/452,530, filed Mar. 14, 2011.

BACKGROUND OF INVENTION

1. Field of Invention

Exemplary embodiments herein generally relate to power transmission couplings. More particularly, the present disclosure relates to couplings for connecting two non-collinear shafts, which are particularly useful in applications (e.g., industrial ovens) where high temperatures, water, chemicals, acids, and/or other conditions exist that could damage conventional couplings.

2. Description of Related Art

Conventional couplings for connecting non-collinear shafts feature needle bearings, direct pin and hole wear points and u-bolt clamped pivot points. Nearly all conventional couplings fail when exposed to high temperatures, water, chemicals, acids, and/or other adverse conditions. Couplings that feature bearings wear quickly because lubrication breaks down and eventually causes damage to the bearing components. The commonly used design features two pins inserted perpendicularly relative to each other in the coupling to allow for angular flexibility in a single plane. Experience shows that these pins wear quickly and the mating holes elongate. When this occurs, the only solution is to replace the entire coupling.

Attempts have been made in the past to machine the pins and holes to recreate a proper fit. However, this can be performed only a few times at best before the entire coupling must be replaced. Replacing the coupling is extremely expensive considering that only small parts of the coupling wear.

Additional challenges are presented during general maintenance of the surrounding components. The coupling must be disassembled to allow shaft removal since there are immovable components on either side of the coupling. This condition prevents needle bearing style couplings. Also critical to the coupling design, the high temperature and corrosive nature of the installed environment produces strict limitations on allowable materials. Similarly, only certain materials are permitted to be used near food products.

BRIEF SUMMARY OF THE INVENTION

In accordance with one aspect, a coupling for connecting two non-collinear associated shafts comprises a pair of sleeves. Each sleeve has a yoke provided at an end portion thereof, the yokes being offset by 90° to one another. Each sleeve further includes a central bore for receiving an end of one of the associated shafts between which motion is to be transmitted. A knuckle is provided between each yoke of the respective sleeves. The knuckle includes a body having a plurality of openings which are offset by 90° to one another. A plurality of pins separate from the knuckle and threadingly engaged to the yokes releasably connects each yoke to the knuckle.

In accordance with another aspect, a method of servicing a coupling adapted to connect two non-collinear associated shafts is provided. The coupling includes a pair of sleeves. Each sleeve has a yoke provided at an end portion thereof, the yokes being offset by 90° to one another. A knuckle is provided between each yoke of the respective sleeves. The knuckle includes a body having a plurality of openings which are offset by 90° to one another. The coupling includes a plurality of bushings. Each bushing is positioned in one of the openings. A plurality of separate pins threadingly engaged to yokes releasably connects the yokes to the knuckle. An end portion of each pin engages one of the bushings. The method of servicing comprises loosening a pair of opposed pins on one of the yokes such that an end portion of each pin is spaced from the corresponding bushing which disengages that yoke from the knuckle; separating the disengaged yoke from the coupling; removing a worn bushing; inserting a different bushing in the knuckle opening; positioning the yoke to reengage the knuckle; and tightening the pins on the yoke until the end portion of each pin engages the corresponding bushing.

In accordance with yet another aspect, a coupling for use in a high temperature environment for connecting two non-collinear associated shafts comprises a pair of sleeves, each sleeve having a yoke provided at an end portion thereof. The yokes are offset by 90° to one another. A knuckle is provided between each yoke of the respective sleeves. The knuckle includes a body having a plurality of openings which are offset by 90° to one another. Each opening extends only partially through the body such that opposed openings provided on the body are not in communication with each other. A plurality of bushings having a central bore is positioned in the openings. A plurality of separate pins threadingly engaged to the yokes releasably connects the yokes to the knuckle. An end portion of each pin is received in the bore of one of the bushings.

BRIEF DESCRIPTION OF THE DRAWINGS

FIGS. 2 and 3 are respective top and front views of the coupling of FIG. 1.

FIGS. 5 and 6 are opposed side views of the coupling of FIG. 1.

FIG. 17 is a perspective view of an exemplary knuckle of the coupling of FIG.

FIG. 18 is a front view of the knuckle of FIG. 17.

FIG. 19 is a cross-sectional view of the knuckle of FIG. 18 taken along line 19-19 of FIG. 18.

FIG. 20 is a top view of the knuckle of FIG. 17.

DETAILED DESCRIPTION OF THE INVENTION

Figure 1:
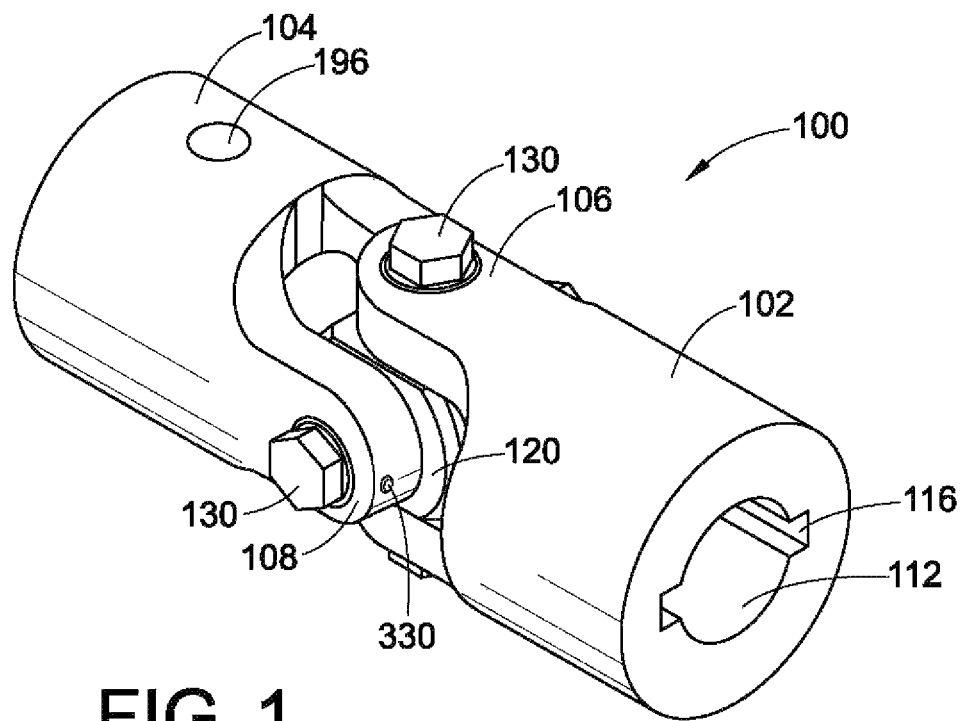
FIG. 1 is a perspective view of an exemplary non-collinear shaft coupling according to the present disclosure in an assembled condition.

It should, of course, be understood that the description and drawings herein are merely illustrative and that various modifications and changes can be made in the structures disclosed without departing from the present disclosure. It will also be appreciated that the various identified components of the exemplary non-collinear shaft coupling disclosed herein are merely terms of art that may vary from one manufacturer to another and should not be deemed to limit the present disclosure.

Referring now to the drawings, wherein like numerals refer to like parts throughout the several views, FIGS. 1-6 illustrate an exemplary coupling 100 for connecting two non-collinear associated shafts (not shown) in an assembled condition. The coupling 100 includes a pair of sleeves 102 and 104. Each sleeve 102, 104 has a respective mounting yoke 106, 108 provided at an end portion thereof. The yokes 106, 108 are offset by 90° to one another. Each sleeve 102, 104 further includes a respective central bore 112, 114 for receiving an end of one of the associated shafts between which motion is to be transmitted. A knuckle 120 is provided between each yoke 106,108 of the respective sleeves 102, 104. A plurality of pins 130 separate from the knuckle 120 and threadingly engaged to the yokes 106, 108 releasably connects each yoke to the knuckle.

As shown in FIGS. 7-11, sleeve 102 is generally cylindrical shaped and includes a shaft portion 140 having an outer surface 142. The bore 112 extends axially through the shaft portion 140 and includes a keyway 146 similar to conventional shafting design to transmit torque; although, this is not required. The yoke 106 of sleeve 102 projects from the shaft portion 140 and includes opposing ears 150 and 152, the ears being spaced so that the knuckle 120 can be positioned therebetween. Each ear 150, 152 includes an outer surface 154, 156 and an inner surface 158, 160. The outer surfaces of the ears are contiguous with the outer surface 142 of the shaft portion 140 such that the yoke 106 is an extension of the shaft portion 140. A threaded aperture 164, 166 extends through an end portion of each respective ear 150, 152. In the illustrated embodiment, axes of the apertures 164, 166 are coaxial, the axis of each aperture being oriented perpendicular to an axis of the bore 112. The inner surface 158, 160 of each ear 150, 152 includes an arcuate wall or ledge 170, 172. Each ledge is located below the aperture 164, 166 and dips toward the shaft portion 140. As will be discussed in greater detail below, the ledges 170, 172 correspond in shape to a portion of the knuckle 120. Additionally, each ear 150, 152 of the yoke 106 includes a threaded bore 176, 178 positioned near the aperture 164, 166 such that the bore is in communication with the aperture. In the depicted embodiment, the bores 176, 178 are provide on curved end walls 180, 182 (i.e., distal ends) of the ears 150, 152. An axis of bore 176 is perpendicular to the axis of aperture 164 and an axis of bore 178 is perpendicular to the axis of aperture 168. According to one aspect of the present disclosure, each respective aperture 164, 166 is located on the same center point as the radius forming the corresponding curved end walls 180, 182; although, this is not required.

Similarly, and with reference to FIGS. 12-15, sleeve 104 is generally cylindrical shaped and includes a shaft portion 190 having an outer surface 192. Sleeve 104 can include a hole 196 extending through the sleeve 104 and having an axis substantially perpendicular to an axis of the bore 114 to also transmit torque; although, this is not required. The yoke 108 of sleeve 104 projects from the shaft portion 190 and includes opposing ears 200 and 202, the ears being spaced so that the knuckle 120 can be positioned therebetween. Each ear 200, 202 includes an outer surface 204, 206 and an inner surface 208, 210. The outer surfaces of the ears are contiguous with the outer surface 192 of the shaft portion 190 such that the yoke 108 is an extension of the shaft portion 190. A threaded aperture 214, 216 extends through an end portion of each respective ear 200, 202. In the illustrated embodiment, axes of the apertures 214, 216 are coaxial, the axis of each aperture being oriented perpendicular to an axis of the bore 114. The inner surface 208, 210 of each ear 200, 202 includes an arcuate wall or ledge 220, 222. Each ledge is located below the aperture 214, 216 and dips toward the shaft portion 190. Similar to ledges 170, 172, the ledges 220, 222 correspond in shape to a portion of the knuckle 120. Additionally, each ear 200, 202 of the yoke 108 includes a threaded bore 226, 228 positioned near the aperture 214, 216 such that the bore is in communication with the aperture. In the depicted embodiment, the bores 226, 228 are provide on curved end walls 230, 232 (i.e., distal ends) of the ears 200, 202, an axis of bore 226 being perpendicular to the axis of aperture 214 and an axis of bore 228 being perpendicular to the axis of aperture 218. Again, each respective aperture 214, 216 can be located on the same center point as the radius forming the corresponding curved end wall 230, 232; although, this is not required.

With reference now to FIGS. 17-20, the knuckle 120 includes a body 250 having four flat side walls 252-258, each side wall being offset by 90° to one another, and a pair of opposed arcuate end walls 260, 262. As indicated previously, arcuate ledges 170, 172 correspond in shape to end wall 260, and arcuate ledges 220, 222 correspond in shape to end wall 262. In the assembled condition of the coupling 100, the end walls 260, 262 are slightly spaced from the ledges of the yokes 106, 108. The body 250 further includes a plurality of openings 272-278, one opening 272-278 for each respective side wall 252-258 such that the openings 270-278 are also offset by 90° to one another. In the depicted embodiment, each opening extends only partially through the body 250 (i.e., has a shallow depth) and includes a tapered bottom. With this construction, opposed openings on the body 250 are not in communication with each other and are separated by a central member 286 of the body 250. Particularly, opening 272 on side wall 252 is separated from opening 276 on side wall 256 by the central member 286, and opening 274 on side wall 254 is separated from opening 278 on side wall 258 by the central member 286. A counterbore 292-298 is provided on each side wall 252-258 and is associated with each respective opening 272-278. Further, axes of the openings 272-278 are coplanar and axes of opposed openings are coaxial. Thus, rotational axes of the pair of yokes 106, 108, which are at least partially defined by the axes of the openings 272-278 (and the pins 130 positioned in the openings), are coplanar.

Figure 4:
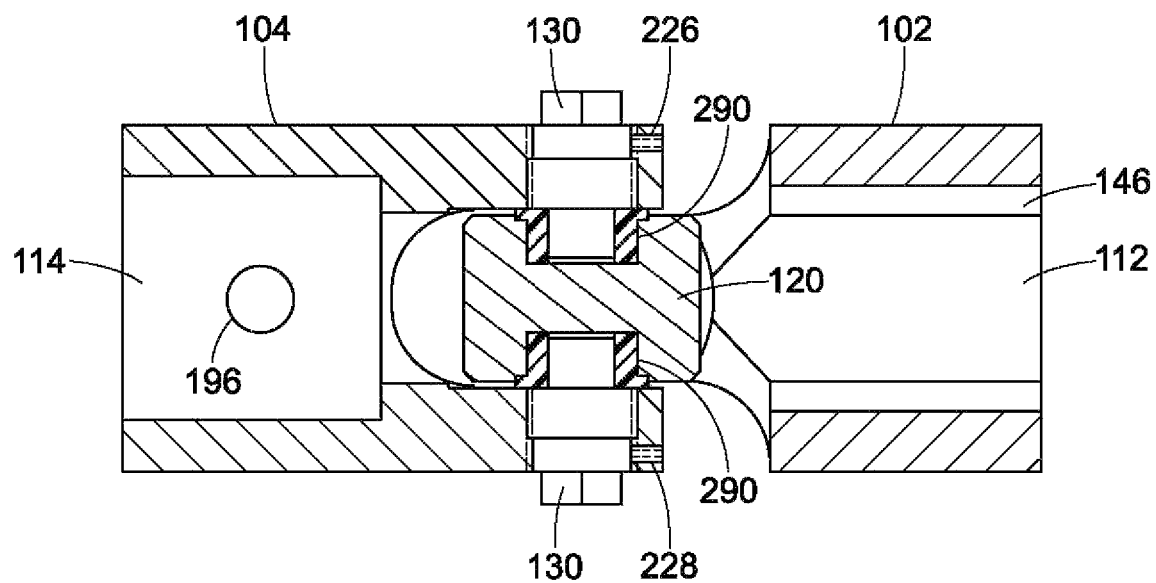
FIG. 4 is a cross-sectional view of the coupling of FIG. 3 taken along line 4-4 of FIG. 3.
Figure 10:
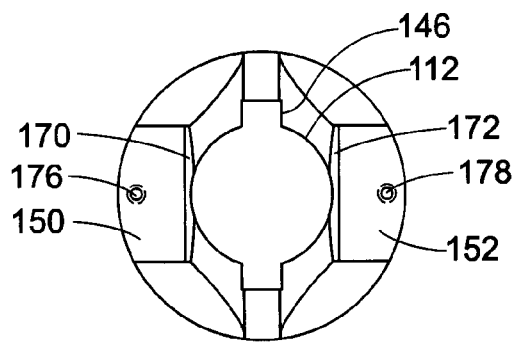
FIGS. 10 and 11 are respective top and bottom views of the sleeve of FIG. 7.
Figure 7:
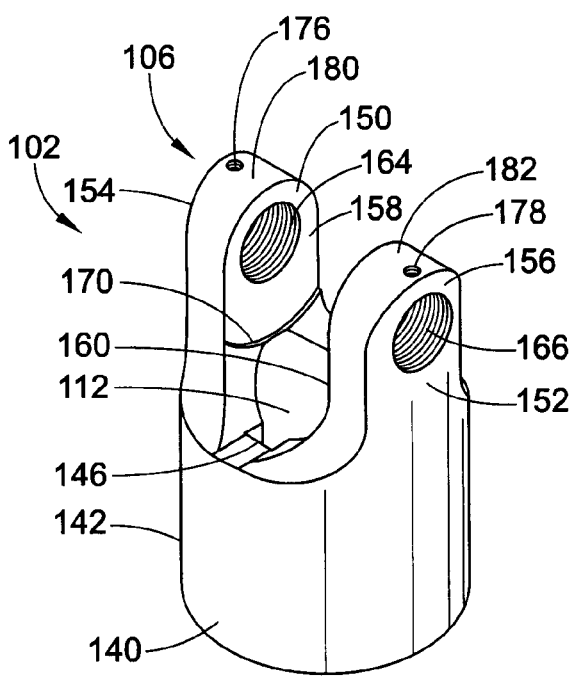
FIG. 7 is a perspective view of one of the exemplary sleeves of the coupling of FIG. 1.
Figure 8:
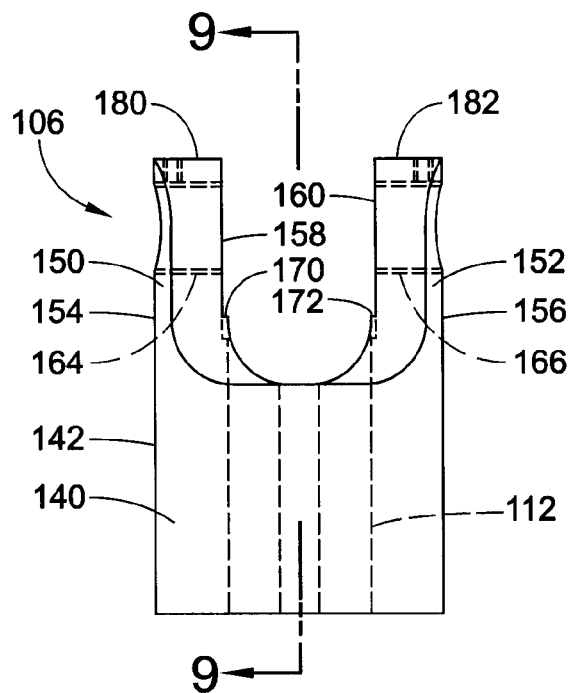
FIG. 8 is a front view of the sleeve of FIG. 7.
Figure 9:
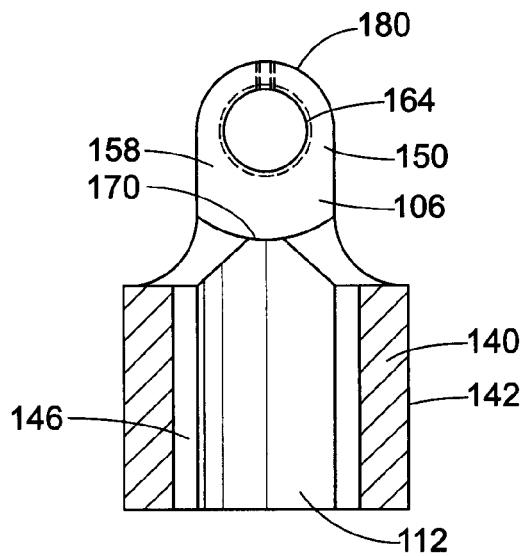
FIG. 9 is a cross-sectional view of the sleeve of FIG. 8 taken along line 9-9 of FIG. 8.
Figure 11:
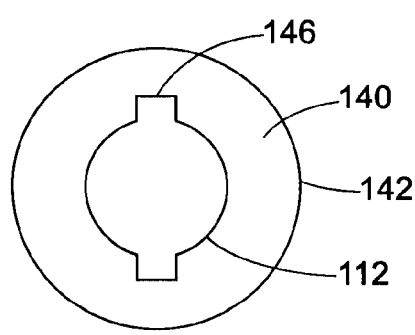
Figure 15:
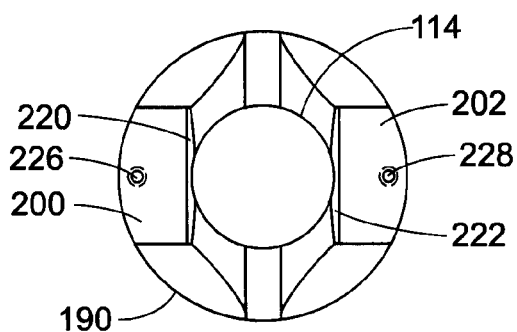
FIGS. 15 and 16 are respective top and bottom views of the sleeve of FIG. 12.
Figure 13:
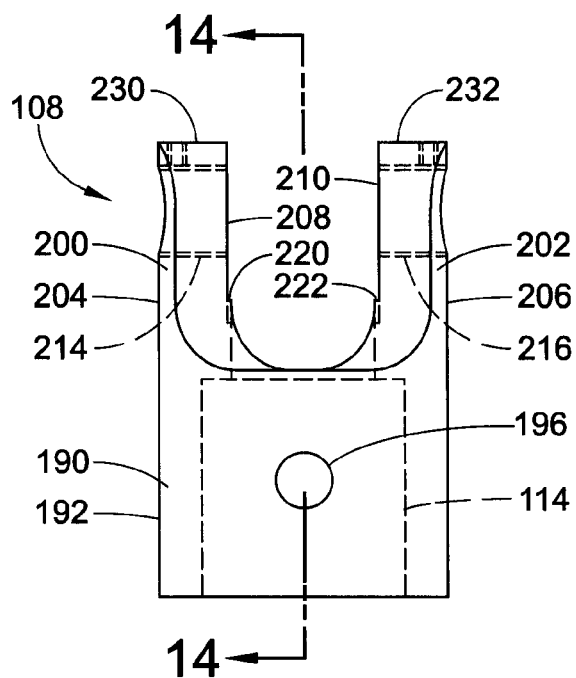
FIG. 13 is a front view of the sleeve of FIG. 12.
Figure 16:
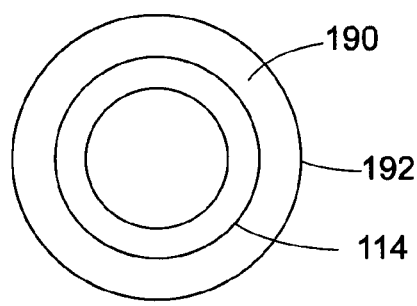
Figure 12:
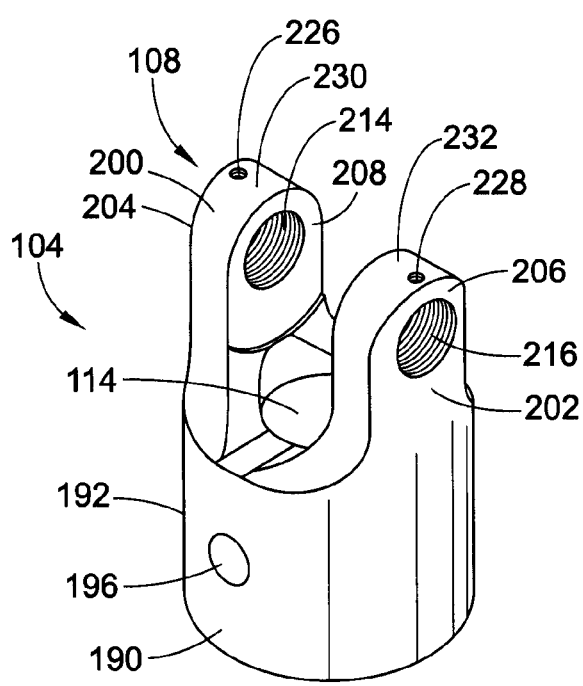
FIG. 12 is a perspective view of the other exemplary sleeve of the coupling of FIG. 1.
Figure 14:
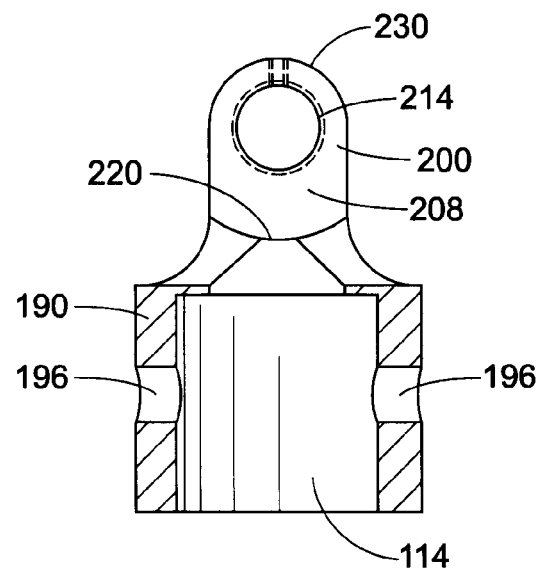
FIG. 14 is a cross-sectional view of the sleeve of FIG. 13 taken along line 14-14 of FIG. 13.
Figure 24:
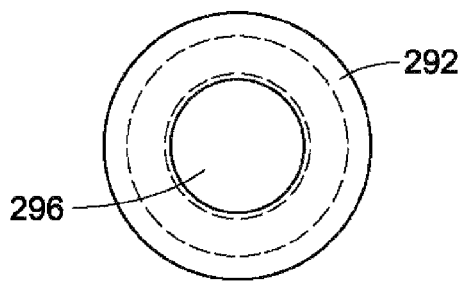
FIG. 24 is a top view of the bushing of FIG. 17.
Figure 21:
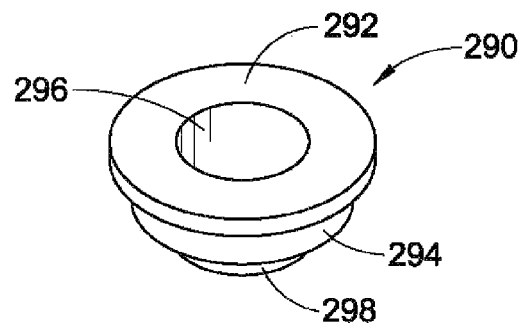
FIG. 21 is a perspective view of an exemplary bushing of the coupling of FIG.
Figure 22:
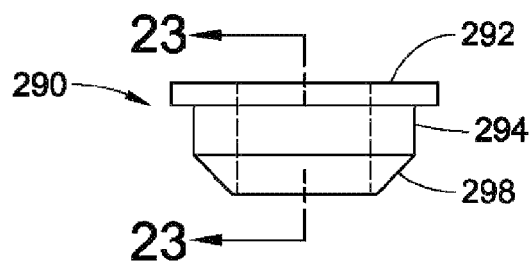
FIG. 22 is a front view of the bushing of FIG. 17.
Figure 23:
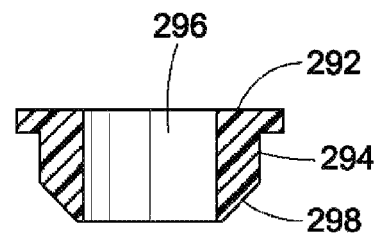
FIG. 23 is a cross-sectional view of the bushing of FIG. 22 taken along line 23-23 of FIG. 22.

The coupling 100 further includes a plurality of bushings 290. As depicted in FIG. 4, each bushing 290 is positioned in one of the openings 272-278 on the knuckle 120. With particular reference to FIGS. 21-24, each bushing 290 includes a flange section 292, a cylindrical shaped body section 294 extending perpendicularly from the flange section, and a central bore 296 extending axially through the sections 292, 294 and concentric with the body section. The flange section 292 has a diameter greater than a diameter of each opening 272-278 of the knuckle 120 such that the flange section 292 abuts the body of the knuckle 120. Particularly, in the assembled condition of the coupling 100 shown in FIG. 4, the flange sections 192 of the bushings 290 are at least partially received in the counterbores 292-294 located on the side walls 252-258 of the knuckle. The remaining portion of the flange sections 292 which extend outwardly from the side walls 252-258 define wear surfaces between the knuckle 120 and the respective yoke 106, 108. The body section 294 of each bushing 290 is tightly received in one of the knuckle openings 272-278. Once positioned in the opening, an axis of the bore 296 is coaxial with the axis of the knuckle opening. An end 298 of the body section 294 of each bushing 290 includes a taper which corresponds in shape to the tapered bottom of each opening 272-278.

Figure 27:
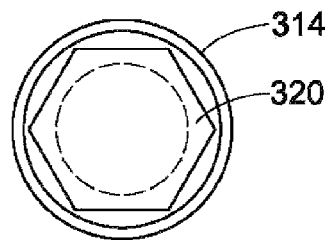
FIGS. 26 and 27 are respective front and top views of the pin of FIG. 25.
Figure 25:
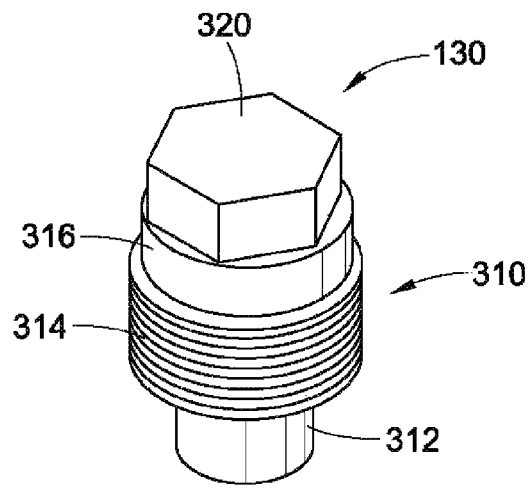
FIG. 25 is a perspective view of an exemplary pin of the coupling of FIG. 1.
Figure 26:
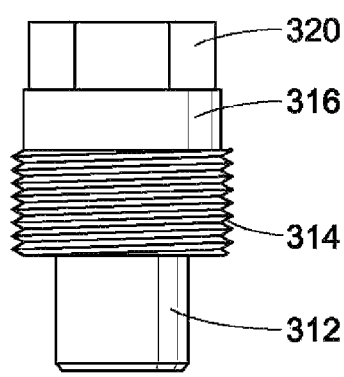

As indicated previously, the plurality of separate pins 130 threadingly engage the yokes 106, 108 to releasably connect each yoke to the knuckle 120. In the illustrated embodiment of FIGS. 25-27, each pin 130 includes a cylindrical shaped body 310 which is separated into a first, non-threaded section 312 having a first diameter, a second, threaded section 314 having a second diameter greater than the first diameter of the first section 312, and a third, non-threaded section 316 having a third diameter smaller than the second diameter of the second section 314. The second section 314 is interposed between the first section 310 and third section 316. Each pin 130 further includes a hex-shaped head 320 located on the third section 316 to allow turning of the pin by conventional tools such as a standard wrench.

With reference to back to FIG. 4, in the assembled condition of the coupling 100, the first section 312 of each pin 130 acts as a pilot and is positioned in the bore 296 of the bushing 290 located in one of the openings 272-278 of the knuckle 120. The second section 314 threadingly engages one of the apertures 164, 166, 214, 216 of the ears 150, 152, 200, 202 of the yokes 106, 108. The second section 314 of each pin 130 engages the flange section 292 of each bushing 290 to limit the threaded position of each pin in the yoke aperture. Thus, the threaded second section 314 acts as a washer or seating surface to set the distance that the pin 130 can be threaded into one of the ears 150, 152, 200, 202 of the yokes 106, 108. The third section 316 is at least partially positioned in the aperture 164, 166, 214, 216. To prevent the loosening of the pins 130, the coupling 100 further includes a plurality of set screws 330 (FIG. 1). Each set screw 330 is threadingly received in one of the bores 176, 178, 226, 228. An end of the set screw 330 protrudes at least partially into the aperture 164, 166, 214, 216 and engages the third section 316 of each pin 130.

According to one aspect of the present disclosure, both the sleeves 102, 104 and the knuckle 120 are machined from 303 or 304 stainless steel. It will be appreciated that other materials could be used. Because the coupling 100 is employed in a high temperature environment, the bushings 290 are manufactured from carbon-filled polyether etherketone, but could be manufactured from other materials to meet specific needs. For example, the busing can be made from PEEK polymer. As is known in the art, bushings made with PEEK polymer are non-galling and non-seizing in contact with metal, and can operate at a continuous temperature of up to 350° F. PEEK polymer is a naturally low-friction and wear-resistant material, and its self-lubricating properties, combined with high temperature capability, make it an ideal choice for the wear components in the coupling 100. The pins 130 can also be manufactured from 303 or 304 stainless steel.

As indicated above, the coupling 100 is assembled by first installing the four identical bushings 290 in the knuckle 120. Each bushing 290 is inserted, tapered end 298 first, into one of the openings 272-278 on one of the flat side walls 252-258 of the knuckle. The angle of the taper on the end 298 of the body section 294 of each bushing 290 matches the angle of the tapered bottom of each openings 272-278 to provide a tight fit of the bushing in the opening. Next, the knuckle 120 can be coupled to the sleeves 102, 104. The sleeve 102 features the yoke 106 having the two ears 150, 152 with the apertures 164, 166 tangent to the sleeve diameter. Similarly, the sleeve 104 features the yoke 108 having the two ears 200, 202 with the apertures 214, 216 tangent to the sleeve diameter. Apertures 164, 166 align with two of the knuckle openings, for example openings 272 and 276, and apertures 214, 216 align with the other two of the knuckle openings, for example openings 274 and 278. With these apertures 164, 166, 214, 216 aligned with the openings 272-278 in the knuckle 120, the pins 130 can be installed. Each of the four pins 130 is preferably identical, which reduces the cost of the coupling 100. Each pin 130 is first slid through the aperture in the sleeve, then through the inside diameter of the bushing 290. When the pin 130 makes contact with the threads in the sleeve, the pin is turned clockwise to engage the threads until the pin second section 314 engages the flange section 292 of the busing 290, and the pin first section 312 is adjacent the central member 286 of the body 250 of the knuckle 120. The process is repeated until each pin 130 is installed in the knuckle 120. When all four pins are installed, they are tightened, preferably to a torque of 15-20 ft-lbs. Set screws 330 can be installed in the threaded bores 176, 178, 226, 228 located perpendicular to the installed pins 130. The set screws are useful for holding the pins in place by contacting the third section or grooves 316 located above the threaded second section 314 of the pins 130.

The present disclosure also provides a method of servicing the coupling 100 for use in a high temperature environment which is adapted to connect two non-collinear associated shafts. The coupling 100 includes the pair of sleeves 102, 104. Each sleeve 102, 104 has the yoke 106, 108 provided at an end portion thereof, the yokes being offset by 90° to one another. The knuckle 120 is provided between each yoke 106,108 of the respective sleeves 102, 104. The knuckle 102 includes the body 250 having the plurality of openings 272-278 which are offset by 90° to one another. The coupling 100 includes the plurality of bushings 290. Each bushing is positioned in one of the openings. The plurality of separate pins 130 threadingly engaged to yokes 106,108 releasably connects the yokes 106, 108 to the knuckle 120. An end portion of each pin 130 engages one of the bushings. The method of servicing comprises loosening a pair of opposed pins 130 on one of the yokes 106, 108 such that an end portion of each pin is spaced from the corresponding bushing 290 which disengages that yoke from the knuckle; separating the disengaged yoke from the coupling; removing a worn bushing; inserting a different bushing in the knuckle opening; positioning the yoke to reengage the knuckle; and tightening the pins on the yoke until the end portion of each pin engages the corresponding bushing.

As is evident from the foregoing, the present disclosure is directed toward a coupling 100 that allows misalignment in a single planar direction during rotation, but which is easily disassembled, field repairable, and constructed of materials safe for food contact and use at high temperatures in a wash down environment. The pivot points of the coupling 100 are coplanar to allow misalignment in a single plane with the pins 130 of a size appropriate to produce acceptable life. The bushings 290 are utilized in the pivot points to allow adjustment for wear and preloading as well as replacement at the end of the bushing life. The bushings 290 can be replaced relatively easily by the end user in the field at significantly lower cost than required to replace or repair conventional couplings. The pins 130 are threaded, which permits removal without specialized tools. The pins 130 can be removed from the side of the coupling. It should be appreciated that the angle of the bushings 290 and material specification are important to the load carrying capability of the coupling 100. Similarly, the orientation of the threaded pins 130 relative to the pivot point is important to load carrying capability as well as access for repair.

The coupling 100 described herein is superior to other designs in several ways. First, the coupling is field repairable. The threaded pins 130 may be removed in the field using standard tools while the coupling 100 is installed. After the threaded pins 130 are removed, the wear bushings 290 may be replaced to return the entire coupling to new specifications. In the event that wear is abnormal, individual parts of the coupling 100 may be replaced instead of the entire coupling. It will also be appreciated that different sleeves can be used to adapt to different shaft end configurations.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of servicing a coupling connecting two non-collinear associated shafts, the coupling including:
   a pair of sleeves, each sleeve having a yoke provided at an end portion thereof, the yokes being offset by 90° to one another,
   a knuckle provided between each yoke of the respective sleeves, the knuckle including a body having a plurality of openings, the openings being offset by 90° to one another,
   a plurality of bushings, each bushing being positioned in one of the openings, and
   a plurality of separate pins threadingly engaged to yokes for releasably connecting the yokes to the knuckle, an end portion of each pin engaging one of the bushings,
   wherein each yoke includes opposing ears, the knuckle being positioned between the opposing ears of each yoke, each ear including an aperture extending therethrough, and
   each pin includes a cylindrical shaped body which is separated into a first, non-threaded section having a first diameter and a second, threaded section having a second diameter greater than the first diameter, the first section being positioned in one of the openings of the knuckle, the second section threadingly engaging one of the apertures,
   wherein each pin further includes a third, non-threaded section having a third diameter smaller than the second diameter of the second section, the second section being interposed between the first and third sections, the third section being at least partially positioned in the aperture, and
   wherein each ear of each yoke includes a threaded bore positioned near the aperture such that the bore is in communication with the aperture, and
   further including a plurality of set screws, each set screw being threadingly received in one of the bores, an end of the set screw protruding at least partially into the aperture and engaging the third section of the pin;
   the method of servicing comprising:
   loosening a pair of opposed pins on one of the yokes such that an end portion of each pin is spaced from the corresponding bushing which disengages that yoke from the knuckle;
   separating the disengaged yoke from the coupling;
   removing a worn bushing;
   inserting a different bushing in the knuckle opening;
   positioning the yoke to reengage the knuckle; and
   tightening the pins on the yoke until the end portion of each pin engages the corresponding bushing.

2. The method according to claim 1, wherein each sleeve further includes a central bore for receiving an end of one of the associated shafts.

3. The method according to claim 1, wherein each bushing is positioned in one of the openings on the knuckle, and each bushing has an axially extending bore dimensioned to receive the first section of one of the pins.

4. The method according to claim 1, wherein each busing includes a flange section and a cylindrical shaped body section, the flange section having a diameter greater than a diameter of each opening such that the flange section abuts the body of the knuckle and defines a wear surface between the knuckle and the respective yoke, the body section being tightly received in one openings.

5. The method according to claim 4, wherein the second section of each pin engages the flange section of each bushing to limit the threaded position of each pin in the yoke aperture.

6. The method according to claim 4, wherein an end of the body section of the bushing includes a taper and each opening includes a tapered bottom which corresponds in shape to the taper of the bushing.

7. The method according to claim 3, wherein the plurality of bushings are made from PEEK polymer.

8. The method according to claim 1, wherein the knuckle includes a pair of opposed arcuate walls and each yoke includes an arcuate ledge which corresponds in shape the one of the arcuate walls.

9. The method according to claim 1, wherein rotational axes of the pair of yokes are coplanar.

10. The method according to claim 1, wherein each opening of the knuckle extends only partially through the body such that opposed openings provided on the body are not in communication with each other.

11. The method according to claim 10, wherein the body of the knuckle includes a central member for separating opposed openings.

12. A method of servicing a coupling connecting two non-collinear associated shafts, the coupling including:
   a pair of sleeves, each sleeve having a yoke provided at an end portion thereof, the yokes being offset by 90° to one another;
   a knuckle provided between each yoke of the respective sleeves, the knuckle including a body having a plurality of openings, the openings being offset by 90° to one another, each opening extending only partially through the body such that opposed openings provided on the body are not in communication with each other;
   a plurality of bushings having a central bore, each bushing being positioned in one of the openings; and
   a plurality of separate pins threadingly engaged to the yokes for releasably connecting the yokes to the knuckle, an end portion of each pin being received in the bore of one of the bushings;
   wherein each yoke includes opposing ears, the knuckle being positioned between the opposing ears of each yoke, each ear including an aperture extending therethrough, wherein each pin includes a cylindrical shaped body which is separated into a first, non-threaded section having a first diameter, a second, threaded section having a second diameter greater than the first diameter, and a third, non-threaded section having a third diameter smaller than the second diameter, the first section being positioned in the bore of one of the bushings, the second section threadingly engaging one of the apertures, wherein a distal end of each yoke ear includes a threaded bore which is in communication with the aperture, and wherein the coupling further includes a plurality of set screws, each set screw being threadingly received in one of the threaded bores, an end of the set screw protruding at least partially into the aperture, the method of servicing comprising:

loosening a pair of opposed pins on one of the yokes such that an end portion of each pin is spaced from the corresponding bushing which disengages that yoke from the knuckle;

separating the disengaged yoke from the coupling;

removing a worn bushing;

inserting a different bushing in the knuckle opening;

positioning the yoke to reengage the knuckle;

tightening the pins on the yoke until the end portion of each pin engages the corresponding bushing; and rotating each set screw until the each set screw engages the third section of each pin.

13. The method according to claim 12, wherein each bushing including a flange section and a cylindrical shaped body section, the flange section abuts an outer surface of the body of the knuckle and defines a wear surface between the knuckle and the respective yoke, the body section being tightly received in one of the openings, and wherein an end of the body section of the bushing includes a taper and each opening includes a tapered bottom which corresponds in shape to the taper of the bushing.

14. The method according to claim 12, wherein rotational axes of the pair of yokes which are at least partially defined by the pin are coplanar.

15. The method according to claim 12, wherein the body of the knuckle includes a central member for separating opposed openings, an end portion of each pin engaging the central member.

16. The method according to claim 12, wherein the plurality of bushings are made from PEEK polymer.

* * * * *